United States Patent [19]

Fah

[11] Patent Number: 4,557,071
[45] Date of Patent: Dec. 10, 1985

[54] AUTOMATIC WATERING AND FEEDING SYSTEM FOR PLANTS

[76] Inventor: Ah N. Fah, 2349 Taman Labu Utama, Seremban N.S., Malaysia

[21] Appl. No.: 617,985

[22] Filed: Jun. 6, 1984

[51] Int. Cl.⁴ .............................................. A01G 25/00
[52] U.S. Cl. ......................................... 47/81; 47/48.5; 47/62
[58] Field of Search ................. 47/62, 79, 80, 81, 48.5, 47/59; 251/65; 137/429, 430, 571, 576

[56] References Cited

U.S. PATENT DOCUMENTS

| | | | |
|---|---|---|---|
| 3,261,125 | 7/1966 | Arkebauer | 47/81 |
| 3,534,498 | 10/1970 | Herrli | 47/81 |
| 3,747,399 | 7/1973 | Treirat | 47/81 |
| 3,755,904 | 12/1973 | Peters | 33/20 R |

FOREIGN PATENT DOCUMENTS

2095083 10/1982 United Kingdom ................. 47/81

Primary Examiner—Robert E. Bagwill
Assistant Examiner—Bradley M. Lewis
Attorney, Agent, or Firm—Erik M. Arnhem

[57] ABSTRACT

A watering and feeding system for plants, comprising a container enclosing a platformed water reservoir, housing a water supply unit, a fertilizer dispensing unit, a nutrient conveying wick and a water level indicator unit, all of which are interacting to provide automatic and adequately measured amounts of nutrients to the plants, embedded in soil on top of the platformed water reservoir.

3 Claims, 11 Drawing Figures

AUTOMATIC WATERING AND FEEDING SYSTEM FOR PLANTS

BACKGROUND OF THE INVENTION

This invention refers to a device, which automatically initiates and cuts off watering and feeding of plants when the dryness, respectively the wetness, of the soil medium so requires. Once installed, the system maintains itself over prolonged periods of time. No external power, such as electricity is needed to keep the device operative.

Potted plants require careful and regular watering and fertilization, dispensed in consistent quantities, in order to promote and maintain healthy growth of the plants.

Although the system, according to the invention, may also be beneficially utilized for one or a few potted plants, it is particularly advantageous when large numbers of plants are displayed, e.g., in high-rise buildings, hotels, etc., virtually eliminating the cost of having a gardener or attendant monitoring the growth and appearance of the plants. On a smaller scale, the system is suitable for traveling or busy people and entire families going on vacation.

Generally, the so-called automatic plant watering devices, presently commercially available, cannot be left unattended for too long a period, as the plants would still require "topping off" with water every few days.

PRIOR ART

Most pertinent classes/subclasses searched were class 47/80,81,79 and Digest 4. The following patent references are believed to be of general interest in view of my invention.

U.S. Pat. No. 3,261,125 to Arkebauer (1966) disclosing a moisture controlling system for plants, using a block of wood as sensing means for central and operation of the device.

U.S. Pat. No. 3,534,498 to Herrli (1970), uses a wick to transport water by capillary action to the plant pot.

U.S. Pat. No. 3,747,399 to Treirat (1973), shows a moisture responsive device of capillary material, one end of which being exposed to the moisture of the soil via a wick.

U.S. Pat. No. 3,755,904 to Peters (1973), describes a double walled device, within which a vacuum is created and then relieved causing water to flow to the soil when sufficiently dry.

British Application No. 2,095,083, to FAH, published 1982 (but subsequently withdrawn) describes a plant pot comprising a double bottomed/walled device, with water supplied and regulated between the bottoms of the device by means of a valve and float system and a water absorbing wick extending from between the bottoms of the device to the soil medium in the plant pot.

SUMMARY OF THE INVENTION

In addition to what was stated above, the device, according to the invention, features an automatic water supply/cut-off assembly, supplying water from below into the soil and automatically shuts off the water after the soil medium has become sufficiently wet. The device provides no replenishing of water until the soil medium has dried out to a predetermined degree. The water supply will automatically be resumed once the predetermined dryness of the soil medium has been reached and the whole cycle is then repeated every one to three days. The device is also provided with an accurate automatic liquid fertilizer dispenser which simultaneously and automatically discharges precalibrated amounts of liquid nutrient into the water whenever the water supply to the plant is resumed.

The invention is made highly versatile by virtue of the variable types of growing medium that may be applied such as compost, soil and soil-mix and pure sand use of the latter may require a slight modification of the device.

The device operates purely on bouyancy of floats on water and no electrical power is required to operate it. As the plants grow bigger, they will consumed more water. The automatic water supply/cut-off assembly will cope with the increased water demand without any problems. As more water is consumed e.g., during the summer, resumption of water supply is automatically accelerated.

The device, as noted, is provided with an automatic liquid fertilizer dispenser which discharges exact amount of liquid fertilizer into the inflowing water simultaneously with the resumption of water supply by the automatic water supply/cut-off assembly. The inflowing water passes through the bottom of the dispenser to achieve more uniform distribution of the fertilizer in the water.

A dispenser with a capacity of 1,000 c.c. of liquid fertilizer is sufficient to nourish an 8-gallon planter for more than a year.

Different fertilizer formulations may be required during certain stages of plant growth and easily be exchanged for one another, when so required, e.g., a formula with a higher potassium content during the fruiting stage of the plant.

Systemic insecticide can be applied through the dispenser either by being mixed into the fertilizer solution or by providing an additional arrangement for an insecticide dispenser with similar functions. This will control most sucking insects such as the common pest, the aphid, etc. A plant hormone for promoting flowering may also be dispensed, similarly to that of the insecticide. The invention is versatile in application, for example it may permit the inclusion of a pH correction fluid. This method of feeding is, according to the invention, accurate and consistent. Nutrients in form of solutions are made available to the plant in small and exact quantities, for frequent periodical applications. This is by far the most efficient method of supplying nutrients to the plants. As the plant grows bigger, more water is being taken up from the device and correspondingly more nutrients being made available to the plant due to the more often discharges, activated by frequent resumption of water supply.

There is no wastage of water and spillage whatever, when the apparatus is in operation, as all the water that is supplied to the planter is either taken up by the plant or lost through evaporation from the soil surface. As compared to hand watering means, the device consumes 80 to 90% less water, mainly because there is no waste through runoff and spillage, a feature extremely useful in the arid countries, where water is scarce. Also, without spillage, the plants are more pleasant and convenient to handle.

The device may be installed as window boxes or at difficulty accessible places with no need for routine attention like watering and feeding; the device is labor saving and, also when installed in hotel rooms, there will be no disturbance to hotel guests.

As mentioned, the invention requires no electrical power to operate, and can be used in remote areas for food production.

The device, according to the invention comprises six basic components, which will be described in detail under (g) of the application, namely: (1) A container, holding a soil medium, (2) a water reservoir, for temporary storage of water, (3) a wick, which triggers the automatic water supply/cut off to the soil medium, (4) an automatic liquid fertilizer, (5) an automatic water supply cut/off assembly, and (6) a water level indicator.

Thus, it is an object of the invention to provide a device, which automatically and consistently supplies measured quantities of water and simultaneously therewith nutrients to one or a series of interconnected plants during prolonged periods of time.

It is further object of the invention to provide such a device to be used e.g., by active people, novices in the field of plant growth, hotels and other large organizations alike.

It is still a further object of the invention to provide a device, which lends itself to mass production at reasonable cost, is easily installed, and when in operation, saves labor with no use of external energy.

DESCRIPTION OF THE INVENTION

In the drawings like reference characters designate similar parts in the several views of the drawings.

Figure 1:
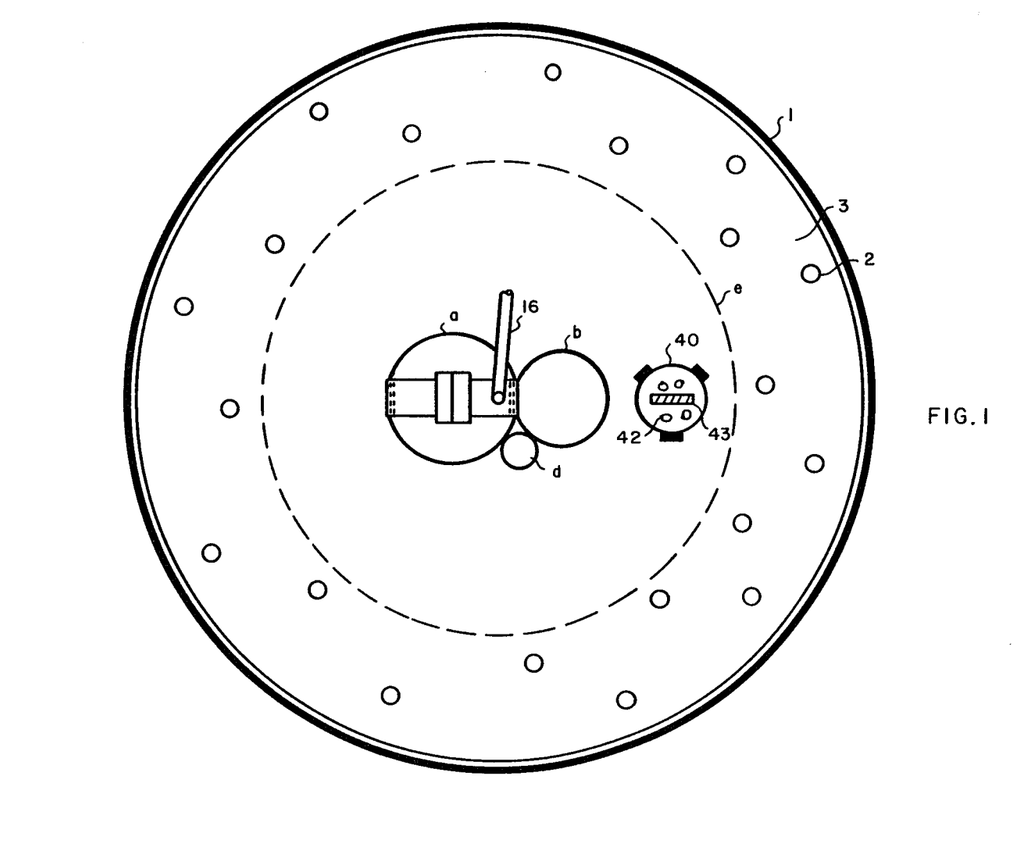
FIG. 1 is a diagrammatic plan top view of the device in its entirety, according to the invention.

In FIG. 1, numeral 1 indicates the device in its entirety, according to the invention. The automatic water supply and cut-off to assembly a is to the left, the automatic liquid fertilizer dispenser b in the middle depression area with wick c to the right and water level indicator d are all seated in the reservoir e shown in dotted lines. On top of the reservoir e is supporting platform 3 with drainage holes 3 provided only outside the periphery of reservoir e, as shown by the dotted lines. The periphery of supporting platform 3 is seated just at the circumference of container 1.

Figure 2:
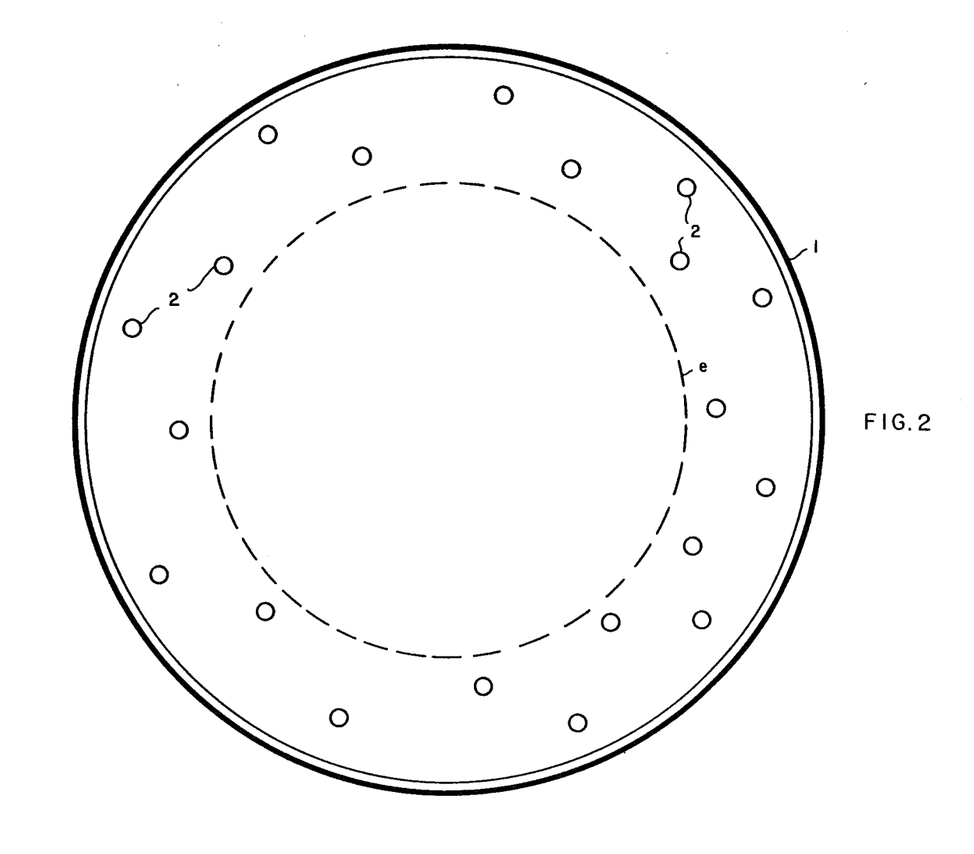
FIG. 2 is a diagrammatic plan bottom view of a container, housing the components of the invention.

In FIG. 2, the dotted lines show the periphery of reservoir e having no drainage holes, while the area between the dotted lines of reservoir e and the edge of container 1 are provided with drainage holes 2.

Figure 3:
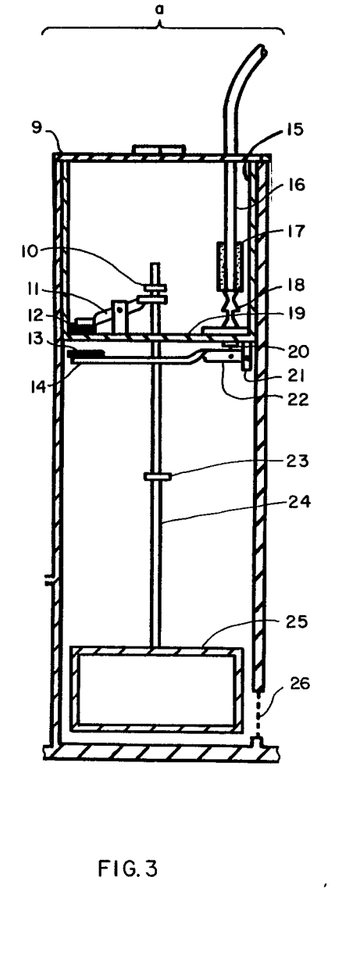
FIG. 3 is a diagrammatic elevational plan view of an automatic water supply/cut-off component of the invention.

Referring to FIG. 3, the entire assembly is housed in jacket 15. It has an inlet tube 16 (tapped from the mains) leading into the assembly connected to filter 17, which is seated just on top of nozzle valve 18, held firmly by assembly platform 19. The lower end of needle 20 is seated in the nozzle valve arm 14 at needle holder 22. The valve arm 14 is pivoted at 21 and has a lower magnet 13 attached at the opposite end. The valve arm has an opening in the middle to allow float-arm 24 to move freely upwardly and downwardly. The assembly platform 19 has an upper arm 11 seated pivotally thereon at 11a. Arm 11 has an upper magnet 12 attached to one end and so aligned thereon as to attract lower magnet 13, the other end of the upper arm 11 has an opening at 11b which allows the float-arm 24 to pass through freely. There is an assembly float 25 at the bottom of jacket 15.

The float 25 has a float-arm 24 attached vertically thereto. The float-arm 24 has an adjustable bottom stop 23 at the lower portion and an upper stop 10 at the upper end. The float-arm 24 passes freely throught the openings of valve arm 14, the assembly platform 19 and the upper arm 11 at 11b.

A cover 9 is provided at top of jacket 15 and a water discharge hole 26 at the bottom of jacket 15, leading to an automatic liquid fertilizer dispenser unit.

Figure 4:
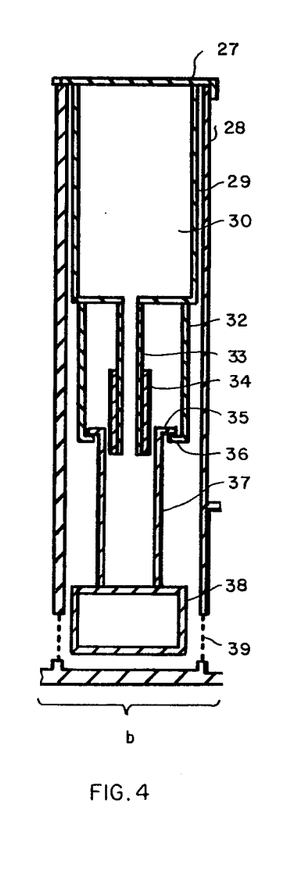
FIG. 4 is a diagrammatic elevational plan view of an automatic liquid fertilizer dispensing unit.

Referring to FIG. 4 illustrating the automatic liquid fertilizer dispenser, its jacket 28 being joined to jacket 15 with a common discharge outlet 26 at the lefthand side bottom thereof. On the right hand side, there is also a discharge outlet 39. The dispenser has a liquid fertilizer storage space 29, which holds the liquid fertilizer in an airtight condition. At the bottom of the fertilizer storage space 29 is an outlet leading from a dispenser tube 33 which shows tube protusions 34. The outer cover of fertilizer storage 29 is a tube jacket 33 which prevents the outer tube 37 from dislocating. The dispenser holder 27 holds the entire unit in suspended position. The outer tube is seated on top of dispenser float 38. The outer tube 37 also has an outer tube hanger 35, to prevent it from dislocating from jacket 33.

Figure 5:
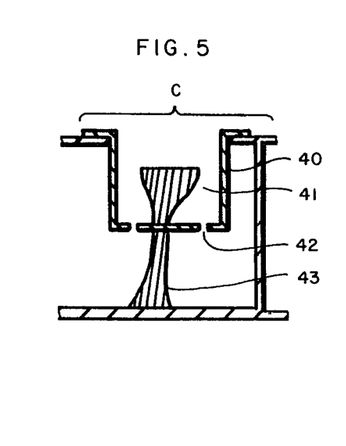
FIG. 5 is a diagrammatic elevational plan view of a wick housing unit.

Referring to FIG. 5, there is shown an apertured depression 40 of the assembly through which a part of wick 43 passes. Drainage holes 42 are provided at the bottom of depression 40, the latter being filled with soil.

Figure 6:
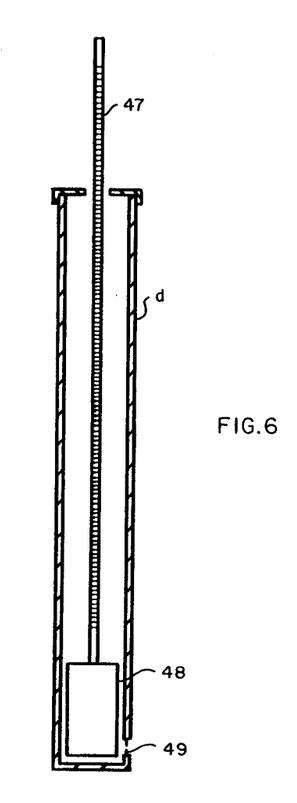
FIG. 6 is a diagrammatic elevational plan view of a water level indicator unit.

FIG. 6 illustrates the water level indicator 46, having a rod 47, preferably made of light weight material, which is attached to float 48. There is provided an opening 49 at the bottom of indicator 46, allowing water to flow into and out of the interior of indicator 46.

Figure 7:
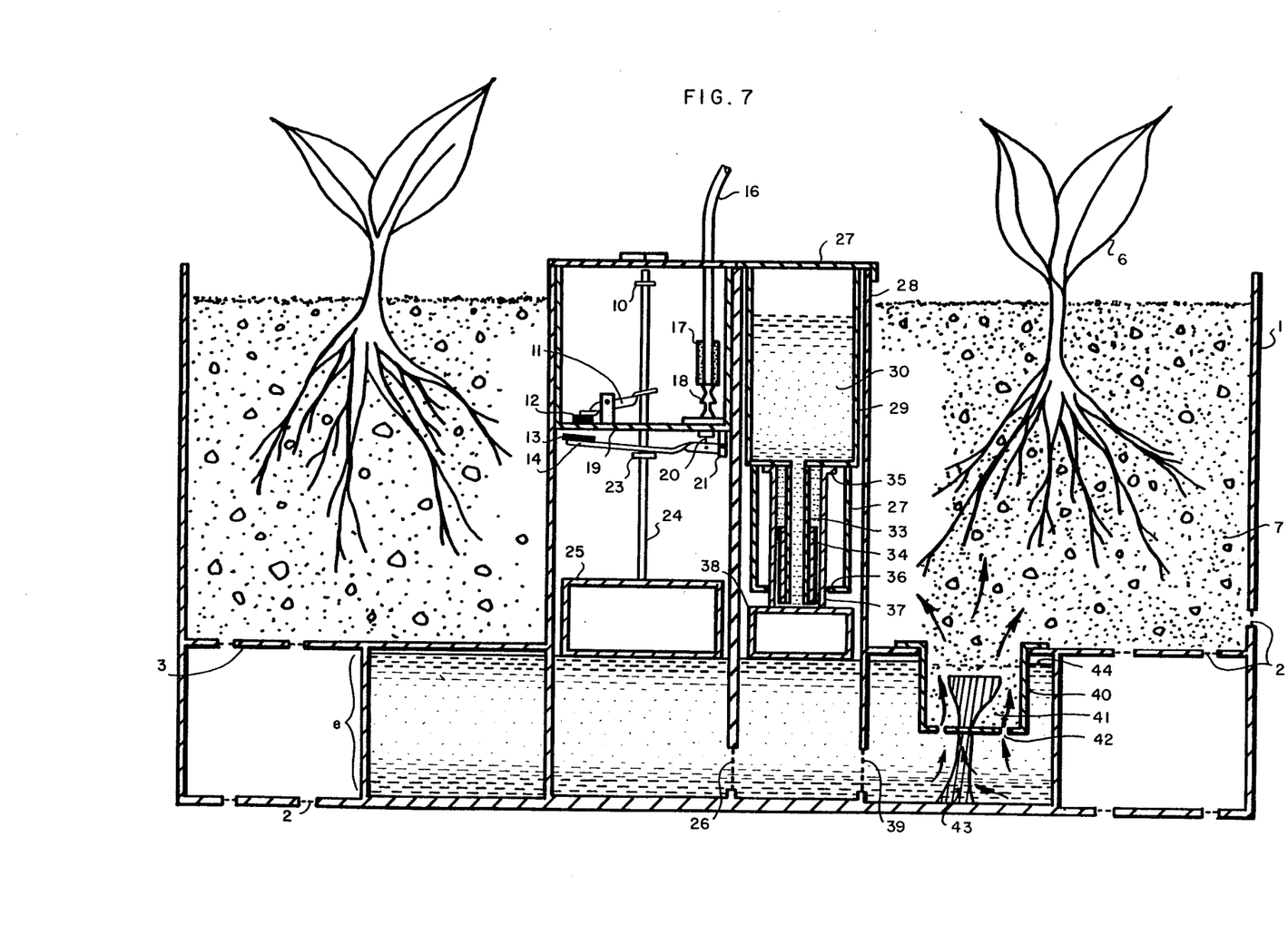
FIG. 7 is a diagrammatic elevational plan view of the device, according to the invention, with a reservoir holding and storing water to capacity, representing the initial step of the operating cycle of the device.

The operational cycle of the device, according to the invention, is as follows:

(1) Referring to FIG. 7, as the beginning of the cycle, the soil 7 is dry, the water is supplied to the maximum level 44 and water supply is then cut-off. At this point, water seeps into the soil 7 through drainage holes 42 of the depression 40 and partly through wick 42. Water 5 will continue to be taken up by the soil 7 by capillary attraction, until the entire soil medium 7 in the container 1 is moist. No further absorption of water 5 will take place once the soil 7 is sufficiently moist.

Figure 8:
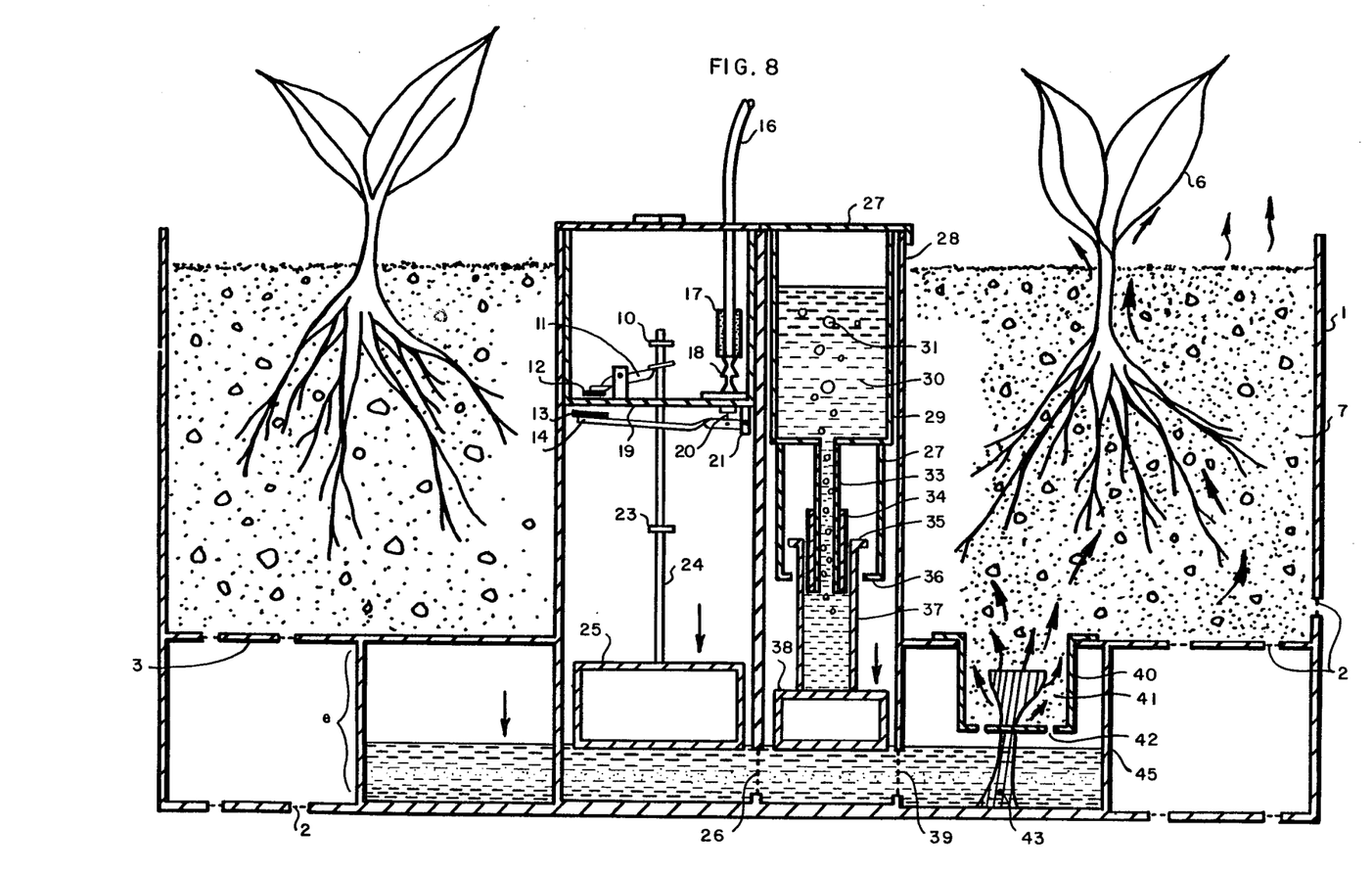
FIG. 8 is a view similar to that of FIG. 7, illustrating the water being drawn from the reservoir.

As water is drawn from the reservoir, the water level will drop, say to the median level at 45 as shown in FIG. 8. When this happens, floats 25 and 38 move downwards correspondingly. Although float 25 has moved downwards, the upper stop 10 in assembly a has not yet come into contact with upper arm 11. However, the valve arm 14 is held in the same horizontal position by the magnetic pull of the upper and lower magnets 12, 13. Thus, the nozzle valve remains closed and water supply is still cut-off.

In the dispenser assembly b, the downward movement of the float 38 causes the outer tube 37 to be filled with liquid fertilizer 30, being discharged from liquid fertilizer storage space 29 caused by the displacement of air bubbles 31. The unit works like an inverted bottle filled with liquid. In depression area c, the water level at 45 is out of contact with the soil in depression 40, water supply to the soil 7 drawn from the reservoir e is solely brought about by wick 42. The wick 42 is a less efficient carrier of water by way of capillary action, as compared to the soil, and the soil medium 7 is then becoming dry.

Figure 9:
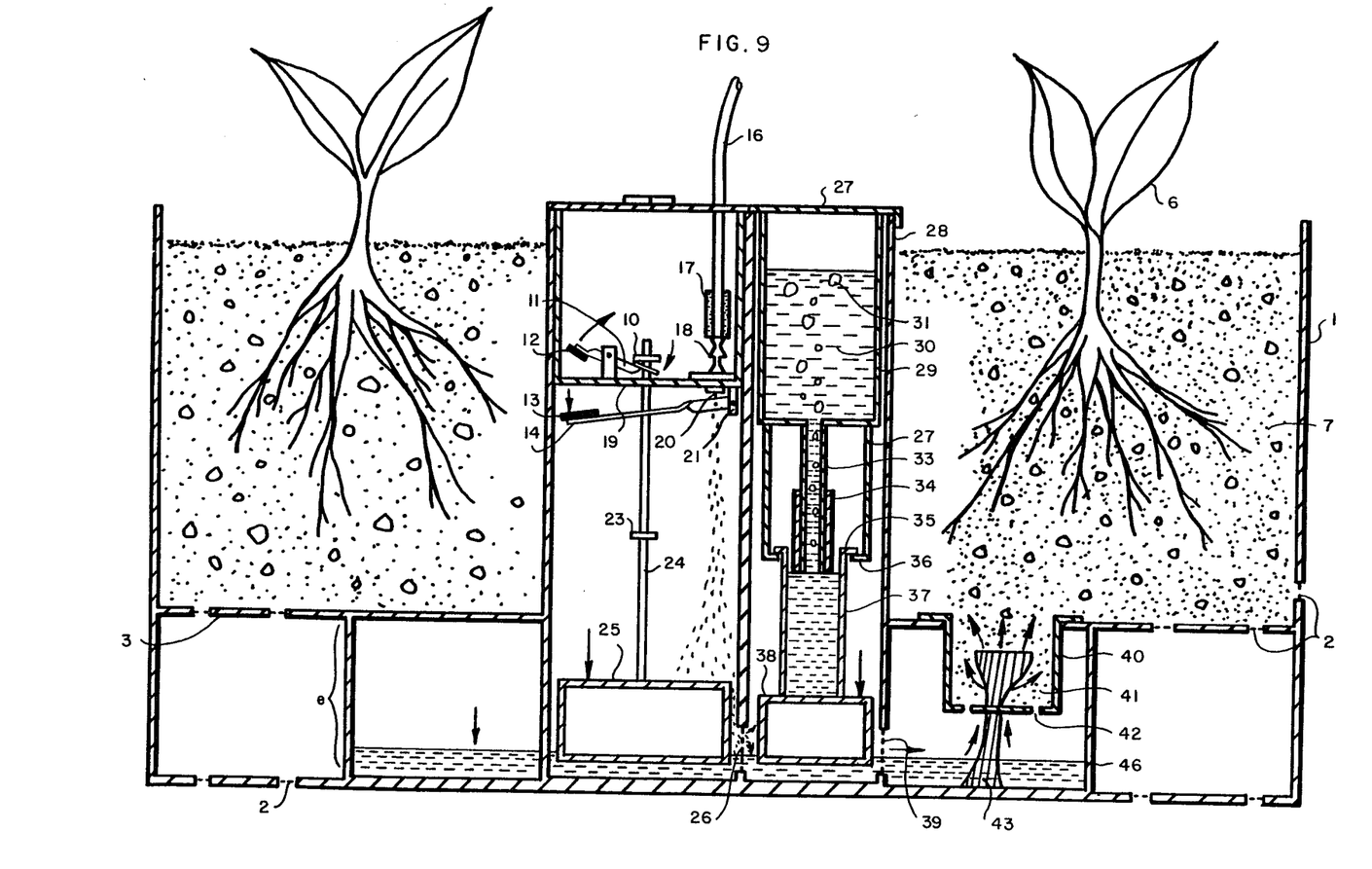
FIG. 9 is a view similar to that of FIG. 7, showing almost complete evacuation of the water from the reservoir.

As the plant consumes more water the water level is drawn progressively from a lower level and also at a progressively slower rate. This is due to the increasing traveling height of the capillary attraction by wick 42 as shown in FIG. 9. When the water level is drawn to lever 46, the float 25 and the dispensing float 38 have also descended correspondingly.

In the assembly a, the descending float 25 eventually causes the upper stop 10 to force the top arm 11 to move the upper magnet 12 upwardly away from the lower magnet 13. The upward movement of the upper magnet 12 will break the magnetic pull from lower magnet 13, causing the valve arm 14 to fall and thereby opening the nozzle valve 18 to allow resupply of water into the reservoir through the discharge hole 26. The valve arm pivot 21 will prevent the valve arm from falling below the angle shown in FIG. 9.

In the liquid fertilizer dispensing unit, float 38 has fully extended the outer tube 37 which is suspended by jacket hanger 36 and outer tube hanger 35. This represents the maximum volume of liquid fertilizer 30 held in outer jacket 37.

In the depression unit c, due to the distance between water level 46 and the soil in depression 40, the rate of capillary water supply though the wick is reduced. At this point, content of soil 7 will be fairly dry and the plants would again require replenishment of water.

Figure 10:
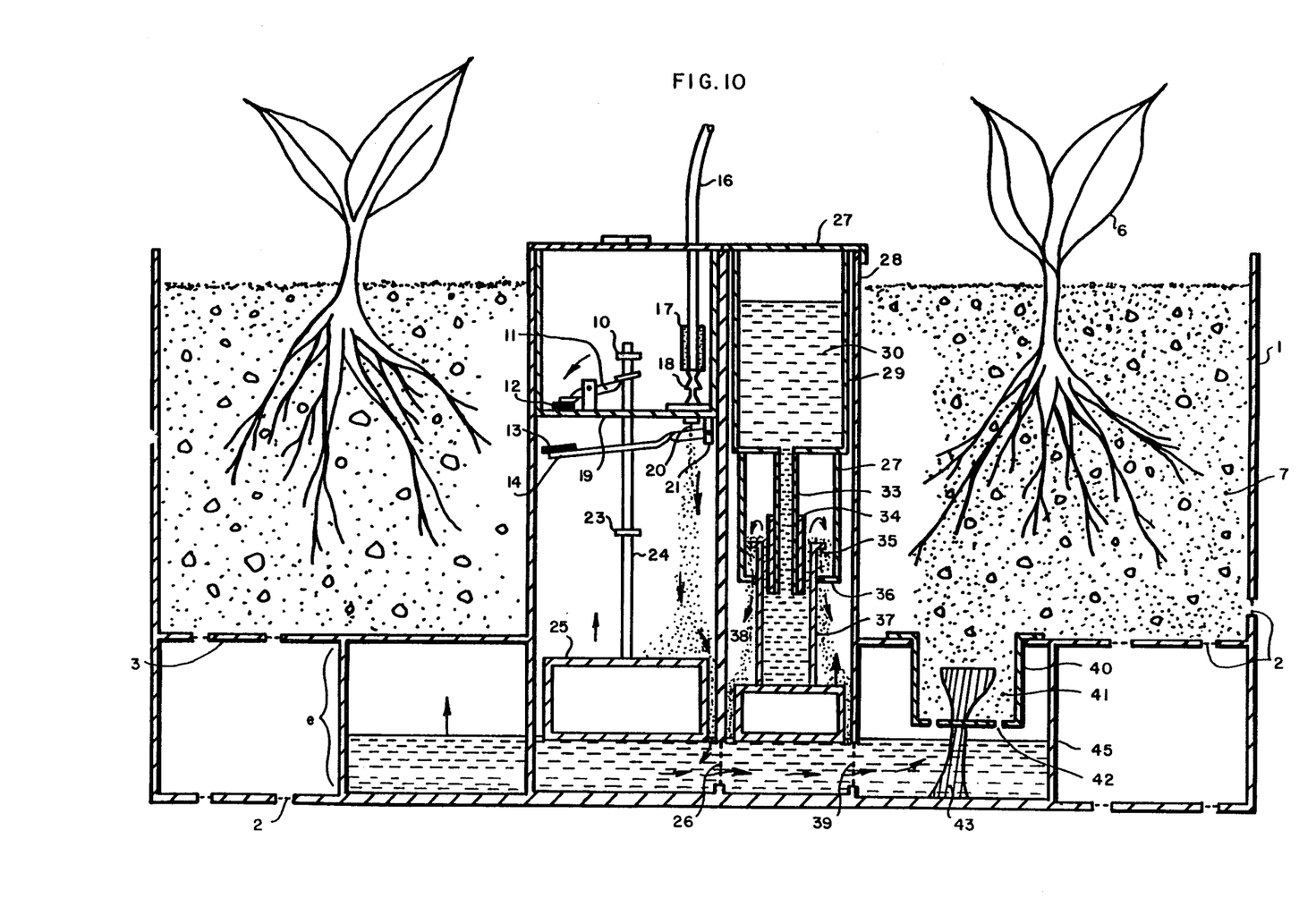
FIG. 10 is a view similar to that of FIG. 7, showing the water being replenished in the reservoir, towards renewing the cycle of operation.

At this point, watering is precisely timely. As water is being replenished, water level rises, say back to median level at 45 again. Both the floats 25 and 38 also rise correspondingly (FIG. 10). In the assembly a, the upward movement did not affect the position of valve arm 14. The nozzle valve 18 remains open and water continues to flow into the reservoir. As the upper stop 10 moves upwardly with float 25, the upper arm 11 is released and falls back to its original position, due to the weight of the attached upper magnet 12. In the liquid fertilizer dispenser unit b, the upward movement of float 38 causes the content of the outer tube 37 to spill into reservoir e due to the displacement by dispenser tube 33. The water from assembly a will flow through discharge hole 26 into the dispenser chamber to mix with the liquid fertilizer, as it flows through discharge hole 39 into the reservoir.

As the water level rises (FIG. 11) and reaches the maximum level at 44, the floats 25 and 38 also move correspondingly upwardly.

Figure 11:
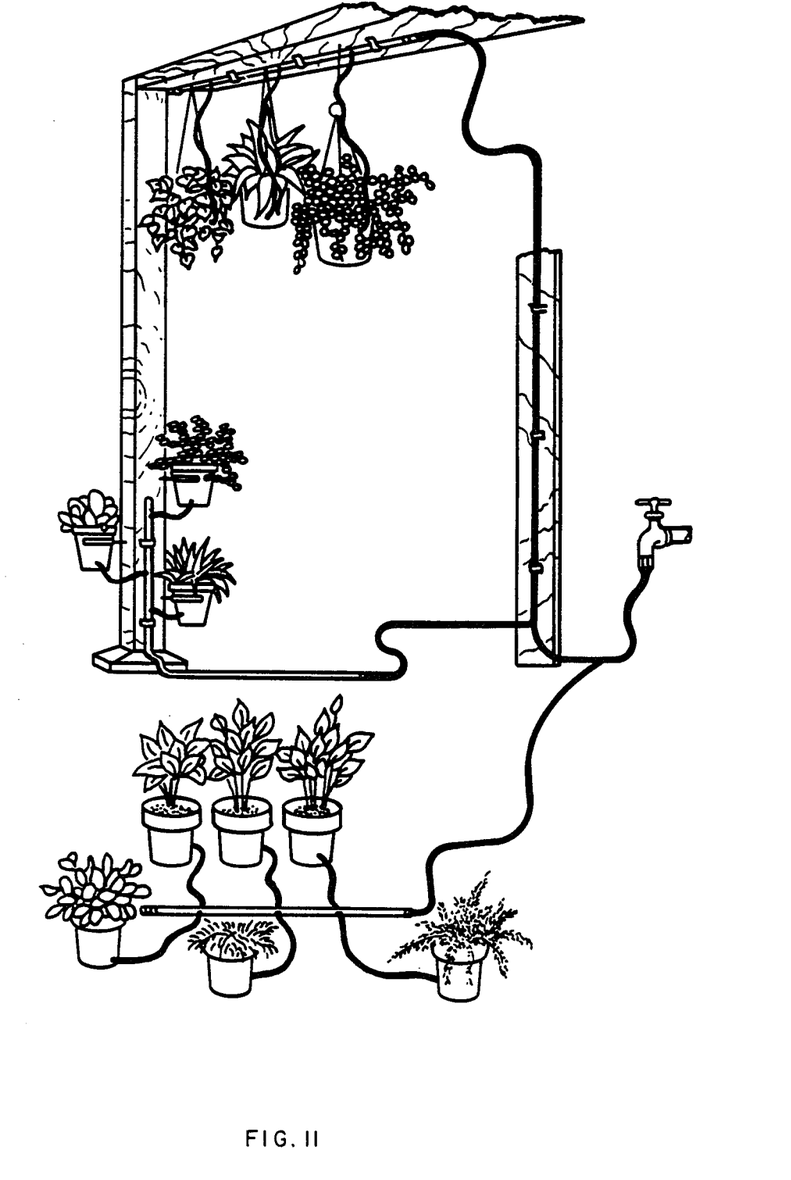
FIG. 11 is a perspective front view of a series of interconnected plants being supplied with water from a common source.

In assembly a, the upward movement of float 25 causes the bottom stop 23 to push the valve arm 14 upwardly until the lower magnet 13 is attracted by the upper magnet 12 and closes the nozzle valve 18 with a sudden slight jerk, thereby cutting off the supply of water.

In the dispenser unit b, the float's 38 upward movement causes the outer tube 37 to spill out its content. Thus, fertilizer is being discharged automatically in precise quantity per watering of the plant. Then, the cycle starts all over again, repeating the steps as described above.

While the foregoing has illustrated and described what is contemplated to be the best mode of carrying out the invention, the description is, of course, subject to modifications without departing from the spirit and scope of the invention. Therefore, it is not desired to restrict the invention to the particular construction illustrated and described, but to cover all modifications that may fall within the scope of the appended claims.

I claim:

1. An automatic watering and feeding system for plants, in combination comprising:

a plant container having a soil medium disposed therein in an annular exterior ring, a water reservoir container disposed centrally in the base of said plant container, also having a water storage annular ring disposed under aforesaid soil medium, at least one wick partially extending down into said water reservoir container through a water reservoir cover having a wick aperture and said at least one wick partially extending up into said soil medium, said at least one wick mid portion being supported by said wick aperture, and said cover having water drainage apertures there through, and, an automatic water supply means having a water filter operatively appended to a water inlet hose, said filter secured to a nozzle valve having a water aperture directed downwardly and said valve held firmly on an assembly platform disposed across an upright tubular water jacket, a needle upwardly secured at a lower needle end to a needle holder arm, the needle upper end oscillatingly secured to said nozzle valve aperture, said needle holder arm is pivotedly secured at a said arm first terminus to said water jacket wall and a first permanent magnet is secured to said needle holder arm upwardly adjacent to a second permanent magnet secured to said assembly platform by a second pivotally secured arm, said pair of magnets adaptively positioned to allow their magnetic field to closely pivotally interact, said needle holder arm and said second arm each having an arm aperture therein freely allowing each said arm to move vertically on a vertically disposed float arm which is secured at one float arm terminus to an assembly hollow water float floating over and on the water disposed in said water reservoir, a pair of opposed bottom and upper stops are adjustably affixed to said vertical float arm limiting the rise and fall of said water float, a cover on said water jacket positioning said water inlet hose, and a water discharge aperture disposed in said jacket side wall at said jacket bottom connecting said water reservoir to an adjacent automatic liquid fertilizer dispenser means, aforesaid at least one wick and aforesaid water drainage apertures providing water to said soil medium by capillary action when said soil medium becomes dry.

2. An automatic watering and feeding system for plants, in combination comprising:

a plant container having a soil medium disposed therein in an annular exterior ring, a water reservoir container disposed centrally in the base of said plant container, also having a water storage annular ring disposed under aforesaid soil medium, at least one wick partially extending down into said water reservoir container through a water reservoir cover having a wick aperture and said at least one wick partially extending up into said soil medium, said at least one wick midportion being supported by said wick aperture, and said cover having water drainage apertures there through, an automatic water supply means having a water filter operatively appended to a water inlet hose, said filter secured to a nozzle valve having a water aperture directed downwardly and said valve held firmly on an assembly platform disposed across an upright tubular water jacket, a needle upwardly secured at a lower needle end to a needle holder arm, the needle second end oscillatingly secured to said nozzle valve aperture, said needle holder arm pivotedly secured at a said arm first terminus to said water jacket wall and a first permanent magnet secured to said holder arm upwardly adjacent to a second permanent magnet secured to said assembly platform by a second pivotally secured arm, said pair of magnets adaptively positioned to allow their magnetic field to closely pivotedly interact, said holder arm and said second arm each having an arm aperture therein freely allowing each said arm to move vertically on a vertical float arm which is secured at one float arm terminus to an assembly hollow water float floating over and on the water disposed in said water reservoir, a pair of opposed bottom and upper stops are adjustably affixed to said vertical float arm limiting the rise and fall of said water float, a cover on said water jacket positioning said water inlet hose, and a water discharge aperture disposed in said jacket side wall at said jacket bottom connecting said water reservoir to an adjacent automatic liquid fertilizer dispenser means, and, an automatic liquid fertilizer dispenser means coadjacent to said automatic water supply means, having a tubular liquid fertilizer container disposed in a vertical tubular jacket coadjacent said water supply means and above a fertilizer dispenser tube having external tube projections thereon, said dispenser tube terminating just above a dispenser hollow float, said dispenser float having a tubular vertical exterior guide tube permanently secured at a first guide tube first terminus to said dispenser float and said second guide tube second terminus having a tube hanger flat ring secured thereto, a dispenser holder securing said tubular liquid fertilizer container in said vertical tubular jacket in a selected position above said water reservoir, said dispenser holder having an opposed open aperture providing guidance for aforesaid tubular exterior guide tube as it moves up and down with the water level in said water reservoir, aforesaid at least one wick and aforesaid water drainage apertures providing water to said soil medium by capillary action when said soil becomes dry.

3. An automatic watering and feeding system for plants, in combination comprising:

a plant container having a soil medium disposed therein in an annular exterior ring, a water reservoir container disposed centrally in the base of said plant container, also having a water storage annular ring disposed under aforesaid soil medium, at least one wick partially extending down into said water reservoir container through a water reservoir cover having an aperture and said at least one wick partially extending up into said soil medium, said at least one wick mid-portion being supported by said wick aperture, and said cover having water drainage apertures there through, an automatic water supply means having a water filter operatively appended to a water inlet hose, said filter secured to a nozzle valve having a water aperture directed downwardly and said valve held firmly on an assembly platform disposed across an upright tubular water jacket, a needle upwardly secured at a lower needle end to a needle holder first arm, the needle upper end oscillatingly secured to said nozzle valve aperture, said needle holder first arm is pivotedly secured at a said arm first terminus to said water jacket and a first permanent magnet is secured to said holder arm upwardly adjacent to a second permanent magnet secured to said assembly platform by a second pivotedly secured arm, said pair of magnets adaptively positioned to allow their magnetic field to closely pivotedly interact, said holder arm and said second arm each having an arm aperture therein freely allowing each said arm to move vertically on a vertical float arm which is secured at one float arm terminus to an assembly hollow water float floating over and on the water disposed in said water reservoir, a pair of opposed bottom and upper stops are adjustably affixed to said vertical float arm limiting the rise and fall of said water float, a cover on said water jacket positioning said water inlet hose, and a water discharge first aperture disposed in said jacket side wall at said jacket bottom connecting said water reservoir to an adjacent automatic liquid fertilizer dispenser means, an automatic liquid fertilizer dispenser means coadjacent to said automatic water supply means, having a tubular liquid fertilizer container disposed in a vertical tubular jacket coadjacent said water supply means, and above a fertilizer dispenser tube having external tube projections thereon, said dispenser tube terminating just above a dispenser hollow float, said dispenser float having a tubular vertical exterior guide tube permanently secured at a guide tube first terminus to said dispenser float and said guide tube second terminus having a tube hanger flat ring secured thereto, a dispenser holder securing said tubular liquid fertilizer container in said vertical tubular jacket, in a selected position above said water reservoir, said dispenser holder having an opposed open aperture providing guidance for aforesaid tubular exterior guide tube as it moves up and down with the water level in said water reservoir, and, a vertical tubular water level indicator secured coadjacently to aforesaid water supply means and aforesaid fertilizer dispenser means and coadjacently connected to aforesaid water supply means and aforesaid fertilizer dispenser means by multiple apertures in the bases of aforesaid two means, said tubular water level having a third hollow float disposed therein, floatable on water and having an indicator lightweight vertical rod secured thereto, said third float raised or lowered in said tubular water level indicator and moving the superimposed lightweight vertical indicator rod up or down as a function of the water level in said water reservoir, indicating the level of water in the water reservoir, aforesaid at least one wick and aforesaid water drainage apertures providing water to said soil medium by capillary action when soil becomes dry.

* * * * *